(12) United States Patent
Dou et al.

(10) Patent No.: US 11,939,929 B2
(45) Date of Patent: *Mar. 26, 2024

(54) ENGINE ELECTRIFIED AIR SYSTEM INCLUDING ELECTRIC TURBOCHARGER AND EXHAUST GAS RECIRCULATION PUMP

(71) Applicant: Deere & Company, Moline, IL (US)

(72) Inventors: Danan Dou, Cedar Falls, IA (US); Eric J. Haaland, Waverly, IA (US)

(73) Assignee: DEERE &COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,656

(22) Filed: Aug. 19, 2021

(65) Prior Publication Data

US 2023/0054060 A1 Feb. 23, 2023

(51) Int. Cl.
*F02M 26/34* (2016.01)
*B60W 10/06* (2006.01)
(Continued)

(52) U.S. Cl.
CPC .......... *F02D 41/005* (2013.01); *B60W 10/06* (2013.01); *B60W 10/08* (2013.01); *B60W 10/26* (2013.01);
(Continued)

(58) Field of Classification Search
CPC ........ F02M 26/34; F02M 26/03; F02M 26/22; F02M 35/104; F02D 41/005;
(Continued)

(56) References Cited

U.S. PATENT DOCUMENTS 6,062,026 A 5/2000 Woollenweber et al.
6,138,649 A 10/2000 Khair et al.
(Continued)

FOREIGN PATENT DOCUMENTS

DE 9421145 U1 5/1995
DE 102006015390 A1 10/2007
(Continued)

OTHER PUBLICATIONS

USPTO Non-Final Office Action issued in Utility U.S. Appl. No. 17/237,876 dated Aug. 16, 2022. (18 pages).
(Continued)

*Primary Examiner* — Gonzalo Laguarda
(74) *Attorney, Agent, or Firm* — KLINTWORTH & ROZENBLAT IP LLP (57) ABSTRACT

An engine system includes an internal combustion engine, an electrical power system configured to provide electrical power in the engine system, and an electrified air system powered by the electrical power system to selectively increase a flow of intake air and exhaust gas to the engine. The electrified air system further includes an EGR pump operable to recirculate a portion of exhaust gas output from the engine and an electric turbocharger including a turbine, a compressor driven by the turbine via a shaft coupled therebetween, and an electrical machine coupled to the shaft. The electrical machine is configured to operate in a motoring mode to drive the shaft and cause the compressor to output boosted intake air to the engine and operate in a generating mode to transform rotational power from the shaft into electrical power that is provided back into the electrical power system.

17 Claims, 3 Drawing Sheets

(51) Int. Cl.
  *B60W 10/08* (2006.01)
  *B60W 10/26* (2006.01)
  *B60W 20/15* (2016.01)
  *F01N 13/10* (2010.01)
  *F02B 39/10* (2006.01)
  *F02D 41/00* (2006.01)
  *F02M 26/03* (2016.01)
  *F02M 26/22* (2016.01)
  *F02M 35/104* (2006.01)

(52) U.S. Cl.
  CPC ............ *B60W 20/15* (2016.01); *F01N 13/10* (2013.01); *F02B 39/10* (2013.01); *F02D 41/0007* (2013.01); *F02M 26/03* (2016.02); *F02M 26/22* (2016.02); *F02M 35/104* (2013.01); *B60W 2510/0638* (2013.01); *B60W 2510/244* (2013.01)

(58) Field of Classification Search
  CPC ... F02D 41/0007; B60W 20/15; B60W 10/06; B60W 10/08; B60W 10/26; B60W 2510/0638; B60W 2510/244; F01N 13/10; F02B 39/10
  See application file for complete search history.

(56) References Cited

U.S. PATENT DOCUMENTS

| | | | |
|---|---|---|---|
| 6,647,724 | B1 | 11/2003 | Arnold et al. |
| 8,176,736 | B2* | 5/2012 | Janssen .................. F02M 26/34 |
| | | | 123/562 |
| 8,181,452 | B2 | 5/2012 | Bidner et al. |
| 8,522,756 | B2* | 9/2013 | Vuk ........................ F02B 33/40 |
| | | | 60/278 |
| 8,820,056 | B2 | 9/2014 | VanDyne et al. |
| 9,347,365 | B2 | 5/2016 | Hunter |
| 9,540,989 | B2 | 1/2017 | Sanchez Perez et al. |
| 9,869,258 | B2 | 1/2018 | Dion |
| 10,145,320 | B1* | 12/2018 | Zeng ...................... F02M 26/49 |
| 10,641,191 | B2 | 5/2020 | Zeng et al. |
| 11,205,789 | B2 | 12/2021 | Tanimoto |
| 11,591,992 | B2* | 2/2023 | Haaland ........... F02M 35/10222 |
| 2008/0092861 | A1 | 4/2008 | Duffy et al. |
| 2009/0107142 | A1 | 4/2009 | Russell et al. |
| 2010/0018203 | A1 | 1/2010 | Richards |
| 2010/0146968 | A1 | 6/2010 | Simpson et al. |
| 2011/0016862 | A1 | 1/2011 | Song et al. |
| 2011/0209473 | A1* | 9/2011 | Fritz ..................... F01K 23/065 |
| | | | 60/657 |
| 2013/0098030 | A1 | 4/2013 | Freund et al. |
| 2013/0297126 | A1 | 11/2013 | Yamazaki et al. |
| 2014/0109571 | A1 | 4/2014 | Primus et al. |
| 2016/0010576 | A1 | 1/2016 | Primus et al. |
| 2016/0265468 | A1 | 9/2016 | Takayanagi et al. |
| 2019/0107066 | A1 | 4/2019 | Kurtz et al. |
| 2019/0383244 | A1 | 12/2019 | Kim |
| 2020/0011229 | A1 | 1/2020 | Waldron et al. |
| 2020/0173354 | A1 | 6/2020 | Punjani et al. |
| 2020/0309059 | A1 | 10/2020 | Hotta et al. |
| 2021/0277849 | A1 | 9/2021 | Rahm et al. |
| 2022/0090566 | A1* | 3/2022 | Magnusson ............ F02M 26/15 |
| 2022/0106919 | A1 | 4/2022 | Carlén Andersson et al. |
| 2022/0381204 | A1* | 12/2022 | Peters ..................... F02D 23/00 |

FOREIGN PATENT DOCUMENTS

| | | |
|---|---|---|
| DE | 102009028925 A1 | 3/2011 |
| DE | 102011077148 A1 | 12/2012 |
| DE | 102012202857 A1 | 8/2013 |
| DE | 102015208418 A1 | 10/2016 |
| FR | 3024178 A1 | 1/2016 |
| FR | 3035151 A1 | 10/2016 |
| FR | 3035443 A1 | 10/2016 |
| FR | 3035444 A1 | 10/2016 |
| FR | 3036738 A1 | 12/2016 |
| FR | 3037616 A1 | 12/2016 |
| FR | 3051225 A1 | 11/2017 |
| FR | 3053397 A1 | 1/2018 |
| FR | 3054602 A1 | 2/2018 |
| GB | 804124 | 11/1958 |
| JP | 09268916 A1 | 10/1997 |
| JP | 2001073880 A1 | 3/2001 |
| JP | 2006057570 A | 3/2006 |
| JP | 4788531 B2 | 10/2011 |
| KR | 101999909 B1 | 7/2019 |
| RU | 2719758 C2 | 4/2020 |
| WO | 2013068800 A1 | 5/2013 |
| WO | 2013186373 A1 | 12/2013 |
| WO | 2019219701 A1 | 11/2019 |
| WO | 2020064679 A1 | 4/2020 |
| WO | 2021005613 A1 | 1/2021 |

OTHER PUBLICATIONS

USPTO Final Office Action issued in Utility U.S. Appl. No. 17/237,876 dated Mar. 8, 2022.
USPTO Non-Final Office Action issued in Utility U.S. Appl. No. 17/237,876 dated Jan. 21, 2022.
Garrett Advancing Motion, 48V Electric Compressor for Mild Hybrid Vehicles, @ 2021 Garrett Motion Inc. (9 pages).
Eaton, Diesel Engine EGR Pump, Precision Air Flow, https://www.eaton.com/us/en-us/products/engine-solutions/superchargers/TVS-technology-applications/tvs-diesel-egr-pump.html, @ 2021 Eaton. (5 pages).
Garrett Advancing Motion, E-Turbo Technology Accelerating Global Powertrain Electrification Trends Beginning with Mercedes-AMG, Media Pressroom—Press Releases, Jul. 22, 2020, @ 2021 Garrett Motion Inc. (4 pages).
University Wisconsin, Electric Turbo Chargers, Overview of Forced Induction System, WEMPEC Electrification of FIS, EFIS Topologies, @ Board of Regents of the University of Wisconsin System, Mar. 2016. (1 page).
Utility U.S. Appl. No. 17/237,876, filed Apr. 22, 2021.
Utility U.S. Appl. No. 17/306,604, filed May 3, 2021.
Utility U.S. Appl. No. 17/308,331, filed May 5, 2021.
Utility U.S. Appl. No. 17/319,256, filed May 13, 2021.
Utility U.S. Appl. No. 17/324,388, filed May 19, 2021.
Utility U.S. Appl. No. 17/358,587, filed Jun. 25, 2021, 2021.
USPTO Non-Final Office Action issued in Utility U.S. Appl. No. 17/308,331 dated Jul. 21, 2022. (23 pages).
USPTO Final Office Action issued in Utility U.S. Appl. No. 17/358,587 dated Jul. 25, 2022. (17 pages).
USPTO Non-Final Office Action issued in Utility U.S. Appl. No. 17/237,876 dated Aug. 31, 2021.
USPTO Non-Final Office Action issued in Utility U.S. Appl. No. 17/306,604 dated Sep. 13, 2022. (13 pages).
Final Office Action issued in Utility U.S. Appl. No. 17/306,604 dated Mar. 7, 2023.

* cited by examiner

ENGINE ELECTRIFIED AIR SYSTEM INCLUDING ELECTRIC TURBOCHARGER AND EXHAUST GAS RECIRCULATION PUMP

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to engine systems and, more particularly, to such engine systems having an electrified air system including an electric turbocharger and exhaust gas recirculation pump.

BACKGROUND OF THE DISCLOSURE

An engine system may include an air system that includes one or more turbochargers that compress intake air that is supplied to combustion chambers within the engine, along with an exhaust gas recirculation (EGR) system that recirculates a portion of exhaust gas back to the engine intake. Each turbocharger typically includes a turbine and a compressor, with the turbine driven by exhaust gas from the engine and the compressor, in turn, being driven by the turbine to compress fluid (air or a fuel and air mixture) and supply the fluid to the combustion chambers. The EGR system may utilize an EGR valve or EGR pump to regulate and assist EGR flow to the engine intake. In an EGR system having an EGR valve, a negative engine delta-pressure (dP) is required to flow exhaust gas back to the engine intake, while the EGR pump provides for a flow of exhaust gas back to the engine intake over an expanded dP operating range.

SUMMARY OF THE DISCLOSURE

An engine system includes an internal combustion engine having an engine block with one or more piston-cylinder arrangements communicating with an intake manifold and an exhaust manifold, and an electrical power system configured to provide electrical power in the engine system, the electrical power system comprising an energy storage device and an electrical bus. The engine system also includes an electrified air system powered by the electrical power from the electrical power system to selectively increase a flow of intake air and exhaust gas to the engine. The electrified air system further includes an exhaust gas recirculation (EGR) pump operable to recirculate a portion of exhaust gas output from the exhaust manifold back to the intake manifold and an electric turbocharger having a turbine in communication with the exhaust manifold, a compressor in communication with the intake manifold and driven by the turbine via a shaft coupled therebetween, and an electrical machine coupled to the shaft. The electrical machine is configured to operate in a motoring mode to drive the shaft and cause the compressor to output boosted intake air to the engine and operate in a generating mode to transform rotational power from the shaft into electrical power that is provided back into the electrical power system.

In another implementation, an engine system for a non-road vehicle includes an internal combustion engine having an engine block with one or more piston-cylinder arrangements communicating with an intake manifold and an exhaust manifold, and an electrical power system configured to provide electrical power in the engine system, the electrical power system comprising an energy storage device and an electrical bus. The engine system also includes an electrified air system powered by the electrical power from the electrical power system to selectively increase a flow of intake air and exhaust gas to the engine, with the electrified air system further including an exhaust gas recirculation (EGR) pump operable to recirculate a portion of exhaust gas output from the exhaust manifold back to the intake manifold and an electric turbocharger having a turbine in communication with the exhaust manifold, a compressor in communication with the intake manifold and driven by the turbine via a shaft coupled therebetween, and an electrical machine coupled to the shaft to provide rotational power thereto or receive rotational power therefrom. The engine system further includes a controller, including a processor and memory architecture, operably connected with the electrified air system to control operation thereof, the controller configured to monitor engine speed and engine load during operation of the engine and selectively operate the electrical machine in a motoring mode and a generating mode based on the engine speed and the engine load, wherein the electrical machine provides rotational power to the shaft to output boosted intake air to the engine when operating in the motoring mode and transforms rotational power from the shaft into electrical power that is provided back into the electrical power system when operating in the generating mode.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, internal combustion engines may include turbocharger(s) and an EGR system to boost a supply of intake air and exhaust gas to combustion chambers within the engine. In operation of the turbocharger(s), exhaust gas produced by the engine is used to drive a turbine of the turbocharger, with exhaust gas flowing through the turbine and causing it to rotate, thereby driving a compressor of the turbocharger such that the compressor forces air into the combustion chambers of the engine. An EGR system may also be provided that operates to recirculate a portion of exhaust gas output from the engine back to the intake manifold thereof. In EGR systems that include an EGR valve to control a flow of exhaust gas back to the intake manifold, the EGR valve allows such EGR flow when the exhaust side pressure in the engine system is higher than the intake side pressure (i.e., a negative dP), with a dP of −50 kPa being desired to enable a suitable flow of exhaust gas. In EGR systems that include an EGR pump to control a flow of exhaust gas back to the intake manifold, the EGR pump enables such EGR flow across a broader dP range, including for small negative dP values and positive dP values.

It is recognized that engine air systems are often calibrated during design and operation to achieve desired performance and fuel efficiency targets. With air systems that include an EGR valve for controlling EGR flow, that is often achieved (in part) by limiting the turbine size to ensure a sufficient negative dP value that provides for the flow of exhaust gas through the EGR valve (i.e., "matching" the turbocharger)—with it recognized that with a smaller turbine, engine calibration limits may be reached sooner at high exhaust flow (engine load) conditions, which would limit the boost of intake air that may be output by the turbocharger. Conversely, with air systems that include an EGR pump for controlling EGR flow, the turbine size can be increased due to the less stringent requirements for controlling dP values to still provide EGR flow; however, the upsizing of the turbine can lead to a slower engine transient response that negatively impacts engine performance. Thus, an issue remains regarding providing a more efficient turbocharger matching where both the turbocharger (turbine) and EGR system benefits can be maximized without suffering the boost and/or transient response shortcomings indicated above.

To provide for a more efficient matching of an EGR system and turbocharger in an air system, an engine system with an electrified air system is provided that includes an arrangement of an electric turbocharger (e-turbocharger) and an EGR pump. The electrified air system receives power from an electrical power system that includes an energy storage device and an electrical bus. In operation of the electrified air system, an electrical machine of the e-turbocharger may operate in a motoring mode to drive a shaft coupling the turbine to the compressor to cause the compressor to output boosted intake air to the engine. Inclusion of the e-turbocharger and EGR pump in the electrified air system allows for a more efficient turbocharger matching in the air system, with an upsizing of the turbocharger being enabled without the system suffering a slower engine transient response. That is, operation of the electrical machine ensures that the turbocharger is able to provide boosted intake air to the engine across a broad range of engine operating conditions (speeds and loads) with no negative impact to transient response.

In addition to the electrical machine operating in a motoring mode to drive the turbocharger shaft to boost intake air to the engine, the electrical machine is also operable in a generating mode to transform rotational power from the shaft into electrical power that is provided back into the electrical power system. The electrical machine can operate in generating mode to convert thermal energy and kinetic energy from the exhaust system back into electric power at engine states where the flow of intake air to the engine is adequate and/or when shaft power exceeds intake air flow requirements. The electrical power produced by the electrical machine while operating in generating mode can be provided back into the electrical power system to recharge the energy storage device therein.

In one implementation, the EGR pump is also configured to operate in both a motoring mode and a generating mode. In both the motoring and generating modes, the EGR pump can recirculate a portion of exhaust gas back to the engine intake. In the generating mode, the EGR pump also provides electrical power back into the electrical power system, responsive to a flow of exhaust gas flowing through the EGR pump. The EGR pump may generally operate in the motoring mode when an intake side pressure of the engine is greater than an exhaust side pressure of the engine and operate in the generating mode when the intake side pressure of the engine is less than the exhaust side pressure of the engine. The delta pressure required for transitioning between motoring and generating states is further influenced by mechanical and electrical system inefficiencies. The EGR pump may also operate in a reverse mode to supply compressed intake air into the EGR system upstream of the turbocharger (turbine), such that the turbine receives both exhaust gas and compressed intake air.

The controller may perform additional control functions regarding the electrified air system to further improve efficiency in operation of the engine system. In one implementation, the controller may operate the electrical machine to minimize exhaust restrictions for reducing the engine pumping loop and for reducing fuel consumption. In another implementation, the controller may also monitor a state-of-charge of the energy storage device to selectively provide recharging thereto via operation of the electrified air system. That is, the controller monitors a state-of-charge of the energy storage device and, when the state-of-charge of the energy storage device is below a pre-determined state-of-charge threshold, the controller operates the electrical machine of the e-turbocharger and/or the EGR pump in the generating mode to provide electrical power that may be used to recharge the energy storage device.

Example embodiments of an engine system having an electrified air system including an EGR pump and an e-turbocharger will now be described in conjunction with FIGS. 1-3 according to this disclosure. By way of non-limiting example, the following describes the engine system as including a turbocharger assembly that includes series-connected high pressure and low-pressure turbochargers for boosting airflow to an internal combustion engine, with the high pressure turbocharge configured as an e-turbocharger. The following examples notwithstanding, engine systems having internal combustion engines and turbocharger assemblies of other constructions would also benefit from an electrified air system as described being incorporated therein according to aspects of the invention. It is therefore recognized that aspects of the invention are not meant to be limited only to the specific embodiments described hereafter.

EXAMPLE EMBODIMENT(S) OF AN ENGINE ELECTRIFIED AIR SYSTEM INCLUDING E-TURBOCHARGER AND EXHAUST GAS RECIRCULATION PUMP

According to embodiments, an engine system is disclosed having an electrified air system including an EGR pump and an e-turbocharger. As will become apparent to those skilled in the art from the following description, the electrified air system finds particular applicability in hybrid-electric engine systems used in a work vehicle, and therefore the illustrative examples discussed herein utilize such an environment to aid in the understanding of the invention.

Figure 1:
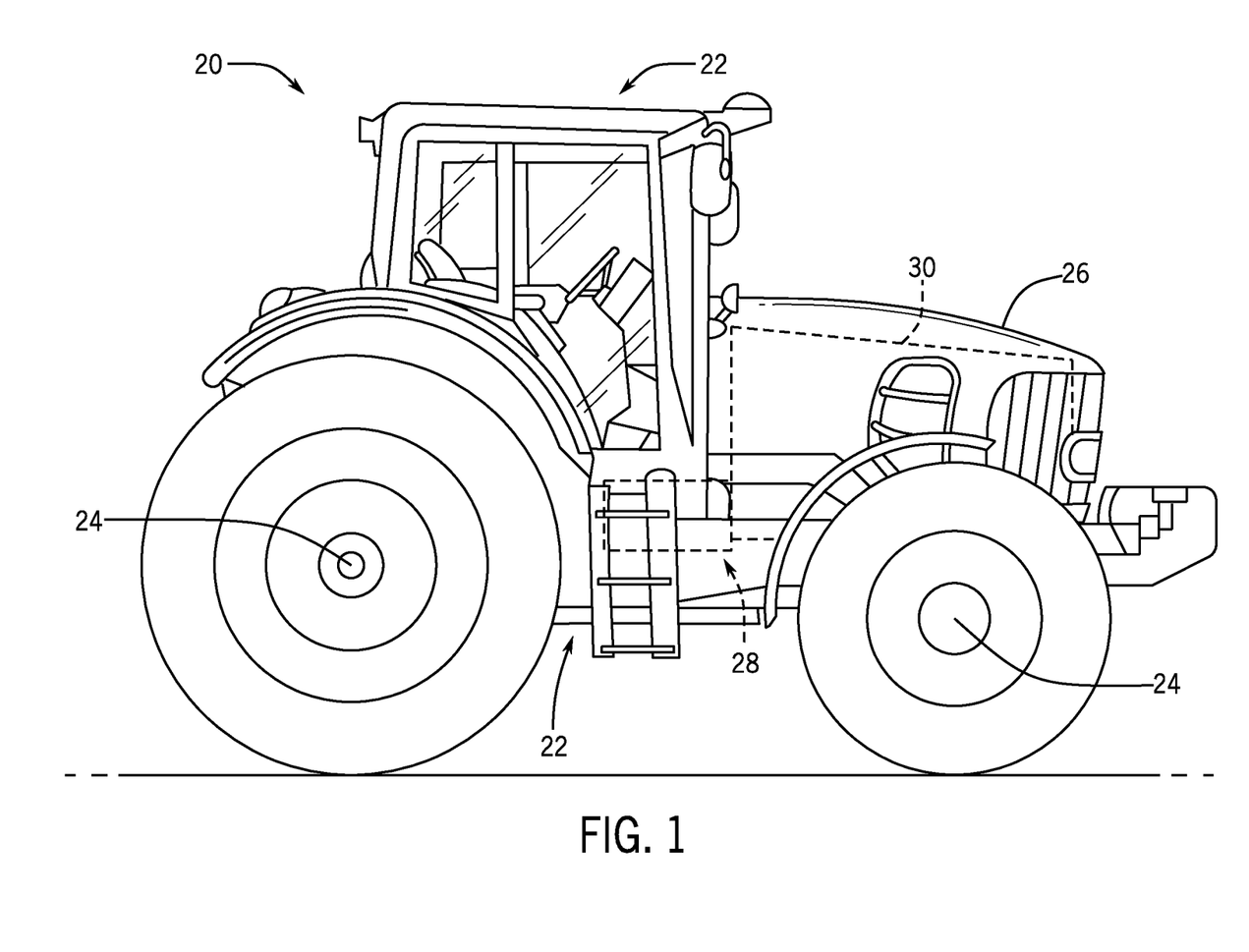
FIG. 1 is a simplified side view of an example work vehicle in which embodiments of the present disclosure may be implemented.

Referring initially to FIG. 1, a work vehicle 20 is shown that can implement embodiments of the invention. In the illustrated example, the work vehicle 20 is depicted as an agricultural tractor. It will be understood, however, that other configurations may be possible, including configurations with the work vehicle 20 as a different kind of tractor, a harvester, a log skidder, a grader, or one of various other work vehicle types. The work vehicle 20 includes a chassis or frame 22 carried on front and rear wheels 24. Positioned on a forward end region of the chassis 22 is a casing 26 within which is located an engine system 30. The engine system 30 provides power via an associated powertrain 28 to an output member (e.g., an output shaft, not shown) that, in turn, transmits power to axle(s) of the work vehicle 20 to provide propulsion thereto and/or to a power take-off shaft for powering an implement on or associated with the work vehicle 20, for example.

Figure 2:
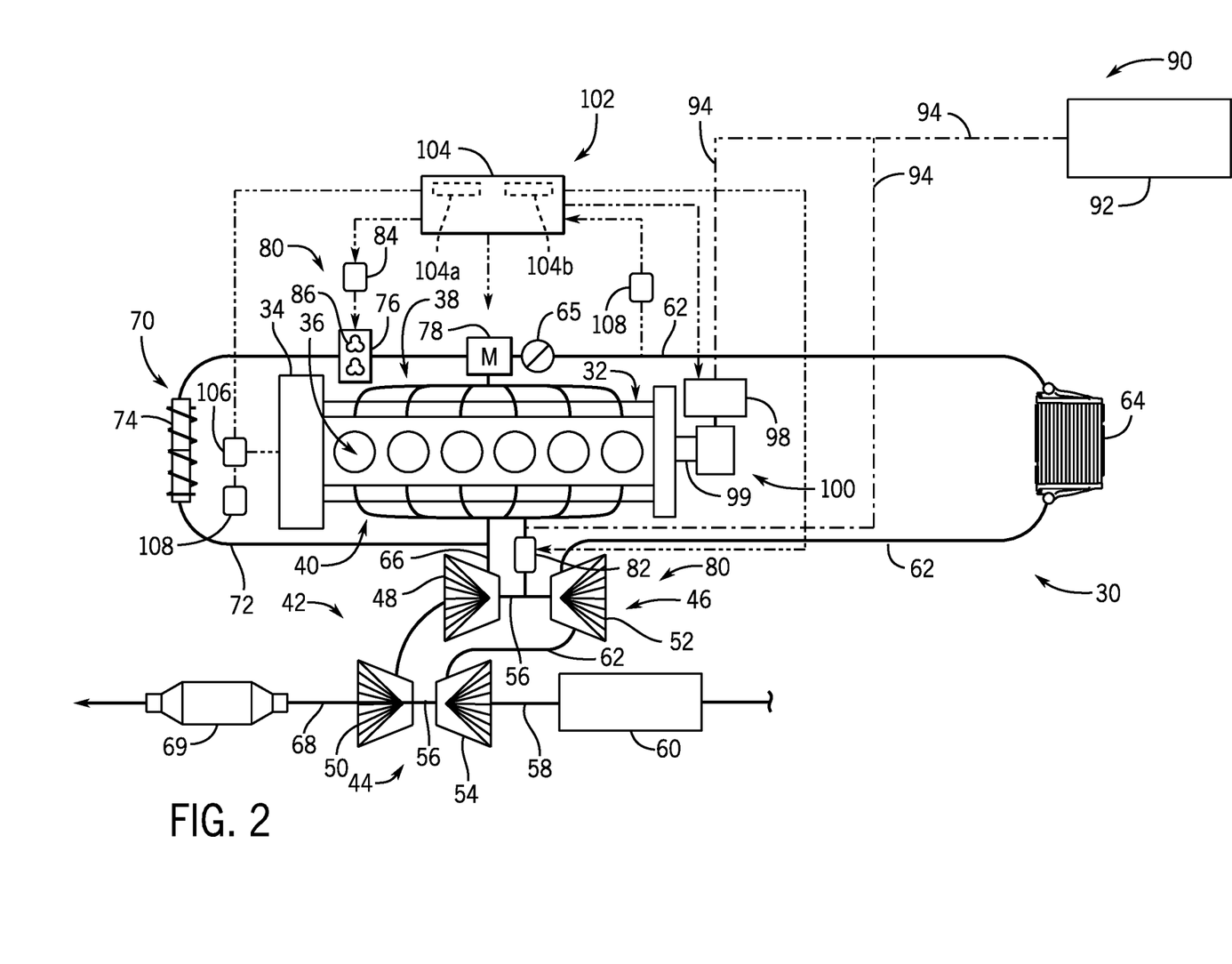
FIG. 2 is a schematic diagram of an example engine system having an electrified air system in accordance with an embodiment.

Referring now to FIG. 2, various components of an example engine system 30 that may be included on the work vehicle 20 are depicted in accordance with an example implementation. The engine system 30 includes an internal combustion engine 32 (hereafter, "engine") in the form of a diesel, compression ignition engine, although it is recognized that the engine 32 could also be powered by different fuel types and or be a spark-ignited engine. The engine 32 of the engine system 30 includes an engine block 34 having a piston-cylinder arrangement 36 therein operable to cause combustion events. In the illustrated implementation, the engine 32 is an inline-6 (I-6) engine; however, in alternative implementations various engine styles and layouts may be used.

The engine system 30 also includes an intake manifold 38 fluidly connected to the engine 32, an exhaust manifold 40 fluidly connected to the engine 32, and a turbocharger assembly 42. In the illustrated embodiment, the turbocharger assembly 42 includes a pair of series-connected turbochargers 44, 46 fluidly connected to and in operable communication with the intake manifold 38 and the exhaust manifold 40, although it is recognized that in other embodiments the engine system 30 could instead include only a single turbocharger. As shown in FIG. 2, the turbocharger assembly 42 includes a low-pressure (LP) turbocharger 44 and a high-pressure (HP) turbocharger 46 arranged in series—with each of the turbochargers 44, 46 including a turbine 48, 50 and a compressor 52, 54 mechanically connected via a rotatable shaft 56. In operation of each of the turbochargers 44, 46, exhaust gas flowing through the turbine 48, 50 causes the turbine to rotate, thereby causing the shaft 56 to rotate. Rotation of the shaft 56, in turn, causes the compressor 52, 54, to also rotate, which draws additional air into the compressors 52, 54 to thereby increase or boost the flow rate of air to the intake manifold 38 above what it would otherwise be without the turbochargers 44, 46, and in this manner the turbochargers 44, 46 supply so-called "charge" air to the engine 32.

As indicated, the HP and LP turbochargers 46, 44 are arranged in series with one another. The HP turbocharger 46 features a turbine 48 (HP turbine) for receiving exhaust gas from the exhaust manifold 40, and a compressor 52 (HP compressor) coupled to the HP turbine 48 for delivering pressurized air to the intake manifold 38 for combustion. The LP turbocharger 44 features a turbine 50 (LP turbine) for receiving exhaust gas from the HP turbine 48, and a compressor 54 (LP compressor) coupled to the LP turbine 50 for delivering pressurized air to the HP compressor 52 for further pressurization. Both the LP and HP turbochargers 44, 46 function to recover a portion of heat energy from the exhaust gas with their respective turbines 48, 50, to drive their respective compressors 52, 54 and thereby boost the amount of charge air delivered to the engine 32 for combustion.

As shown in FIG. 2, the intake manifold 38 is in fluid communication with the piston-cylinder arrangement 36 to direct a supply of air thereto. Fresh air is provided to the intake manifold 38 from the ambient environment via a fresh air intake passageway 58. Fresh air is drawn into the fresh air intake passageway 58, passed through an air filter 60 disposed in-line with the fresh air intake passageway 58, and provided to the LP compressor 54. The LP compressor 54 performs a first compression to the fresh air and provides it to the HP compressor 52 via a charge air passageway 62. The charge air passageway 62 then runs from the HP compressor 52 to the intake manifold 38 to provide compressed charge air from the HP compressor 52, with a charge air cooler 64 (i.e., aftercooler) positioned in-line with the charge air passageway 62 that reduces the temperature of the charge air prior to it being provided to the engine 32, to increase the unit mass per unit volume (i.e., density) of the charge air for improved volumetric efficiency and higher power output. In one embodiment, an air throttle 65 is also positioned in the charge air passageway 62 to regulate the amount of compressed charge air provided to the intake manifold 38.

The exhaust manifold 40 of the engine system 30 is fluidly coupled to inlets of the turbines 48, 50 of the turbochargers 44, 46 via an exhaust gas passageway 66, with fluid outlets of the turbines 48, 50 then fluidly coupled to the ambient environment via a vent passageway 68. Exhaust gas produced by the engine 32 is directed out from the exhaust manifold 40 and passes through the exhaust gas passageway 66 to the turbines 48, 50, with the exhaust gas then exiting the turbines 48, 50 to the ambient environment via the vent passageway 68 in a conventional manner. An aftertreatment system 69 may be disposed in-line with the vent passageway 68 to treat the exhaust gas prior to the exhaust gas being vented to ambient, such as by performing a diesel oxidation catalyzation, diesel particulate filtration (DPF), or selective catalyst reduction, for example.

An exhaust gas recirculation (EGR) system 70 is further provided in the engine system 30 that functions to recirculate a portion of the exhaust gas generated by the engine 32 and thereby reduce the formation of NOx during combustion. Exhaust gas is drawn from the exhaust manifold 40 and recirculated into the intake manifold 38 via the EGR system 70. The EGR system 70 includes an EGR passageway 72, an EGR cooler 74, an EGR pump 76, and an EGR mixer 78. The EGR passageway 72 draws in a portion of the exhaust gas that is flowing within the exhaust gas passageway 66 for circulation through the EGR system 70. In the illustrated embodiment, the EGR passageway 72 draws a portion of the exhaust gas that is flowing within the exhaust gas passageway 66 from a location upstream from the HP turbocharger 46, but it is recognized that the EGR passageway 72 could instead draw exhaust gas from the exhaust gas passageway 66 from a location downstream from the HP turbocharger 46 or downstream from both the HP turbocharger 46 and the LP turbocharger 44. The EGR cooler 74 is disposed in-line with the EGR passageway 72 for the purpose of cooling the exhaust gas flowing through the EGR passageway 72.

Exhaust gas flows to the EGR pump 76, with the EGR pump 76 having an inlet side in fluid communication with the exhaust manifold 40 and an outlet side in fluid communication with the intake manifold 38. The EGR pump 76 may be a positive-displacement type compressor capable of delivering physically metered air flow rates, such as a roots, screw, scroll, or vane compressor, or alternatively may be a radial-type compressor similar to a turbocharger compressor. The EGR pump 76 may selectively control the flow of exhaust gas recirculated from the exhaust gas passageway 866 to the engine 32 via the EGR passageway 72, including cutting off the flow of exhaust gas therethrough and selectively restricting or controlling the flow of exhaust gas therethrough by a desired amount. Exhaust gas that is pumped by the EGR pump 76 is provided to the EGR mixer 78, which intermixes the exhaust gas with the charge air provided from the charge air passageway 62 for introduction to the intake manifold 38, by which the mixed exhaust gas and charge air is then fed to the engine 32. In other implementations, a dedicated EGR mixer 78 may not be included in the engine system 18, with exhaust gas instead being introduced to induction piping of the engine 32 and/or the intake manifold 38 for mixing with the charge air.

In one embodiment, the EGR pump 76 is configured as a reversible pump that is operable to both flow exhaust gas to the intake manifold 38 and to provide a portion of the compressed charge air flowing from charge air passageway 62 (into the intake manifold 38) through the EGR passageway 72 and into the exhaust gas passageway 66, while bypassing the engine 32, such that charge air is introduced into the exhaust gas output by the engine 32. This compressed charge air output from the EGR pump 76 is thus mixed with the exhaust gas to provide an increased fluid flow to the inlet of the turbines 48, 50 for the purpose of selectively increasing the flow rate of gas supplied to the turbochargers 44, 46.

According to embodiments, the turbocharger assembly 42 and EGR pump 76 are provided as part of an overall electrified air system 80 that controls the flow of intake air and exhaust gas within the engine system 30. Each of the turbocharger assembly 42 and EGR pump 76 includes an electrical machine that operates on electrical power provided in the engine system 30 (as will be explained below) to boost the flow of intake air or exhaust gas within the system. Thus, according to an embodiment, an electrical machine 82 is provided for at least one of the HP turbocharger 46 and the LP turbocharger 44 in the turbocharger assembly 42, such that the turbocharger 46, 44 is configured as an electric turbocharger (hereafter "e-turbocharger"), while the EGR pump 76 also includes an electrical machine 84 that may drive mechanical components of the EGR pump, such as rotors 86 in one embodiment.

Regarding the turbocharger assembly 42 in the illustrated example, the HP turbocharger 46 is configured as the e-turbocharger (and thus hereafter referred to as "e-turbocharger 46), although it is recognized that the LP turbocharger 44 may be configured as the e-turbocharger or that both the HP turbocharger 46 and the LP turbocharger 44 may be configured as e-turbochargers, and thus embodiments of the invention are not limited only to the arrangement shown in FIG. 2. In configuring the HP turbocharger 46 as an e-turbocharger, the electrical machine 82 is mechanically coupled to the shaft 56 to selectively provide rotational thereto and receive rotational power therefrom. As will be explained in further detail below, the electrical machine 82 is operable in different modes during operation of the engine system 30, including in a "motoring mode" and a "generating mode."

Regarding the EGR pump 76, the electrical machine 84 is mechanically coupled to the rotors 86 to selectively provide rotational thereto and receive rotational power therefrom. As will be explained in further detail below, the electrical machine 84 is operable in different modes during operation of the engine system 30, including in a "motoring mode," a "generating mode," and a "reverse mode." These modes may also be termed an "EGR motoring mode," an "EGR generating mode," and an "EGR reverse mode" to distinguish them from the modes of the electrical machine 82 in the e-turbocharger 46.

For providing electrical power to the electrical machines 82, 84 of the e-turbocharger 46 and EGR pump 76, an electrical system 90 is provided in the engine system 30 that may include one or more energy storage devices, inverters, converters, wiring, and other electric components. In one example, the electrical system 90 includes an energy storage device 92 in the form of a lithium-ion battery, although other high-voltage or high-power energy storage devices may instead by employed, such as other battery types, an ultracapacitor, or a combination of ultracapacitors and/or batteries, as examples. The energy storage device 92 provides a DC power to a power converter (not shown), such as a DC-to-DC converter that outputs power to a DC bus 94, with the DC bus 94 providing power to multiple devices, outlets, etc. in the engine system 30, including the electrical machines 82, 84 and components such as a cooling pump (not shown) or an electrical motor of a fan used for cooling (not shown), for example. In one implementation, the electrical system 90 is configured as a 48V system that, in combination with engine 32, forms a "hybrid-electric" engine system for the work vehicle 10 (FIG. 1).

In one implementation, an electric motor-generator unit 98 is further provided in the engine system 30. The motor-generator unit 98 is an electrical machine operable in different modes, i.e., as a motor and as a generator, to draw electrical power from the DC bus 94 or to provide power back to the DC bus 94 for recharging the energy storage device 92. When operating as a motor, the motor-generator unit 98 can function to convert electrical power from the DC bus 94 to mechanical power and transfer the mechanical power to the engine 32 via one or more driveline component(s) 100, which may include one or more gear sets, chain-driven sprockets, shafts, belt-drives, and/or other members configured to rotate for transferring mechanical power. The motor-generator unit 98 can therefore operate to assist in starting the engine 32 or to selectively boost an output torque of the engine 32 during operation thereof (e.g., turning crankshaft 99). When operating as a generator, the motor-generator unit 98 can function to receive power back from the engine 32 (i.e., the engine 32 may drive power back through the driveline component(s) 100) such that the motor-generator unit 98 generates electrical power. The generated power may be supplied to the DC bus 94 for storage in the energy storage device 92 or for supplying to onboard or off-board electrical devices.

As illustrated in FIG. 2, the engine system 30 includes a control system 102, which includes a controller 104 or electronic control unit (ECU). The controller 104 includes a processor 104a and memory 104b. The processor 104a performs the computation and control functions of the controller 104 and may comprise any type of processor or multiple processors, single integrated circuits such as a microprocessor, or any suitable number of integrated circuit devices and/or circuit boards working in cooperation to accomplish the functions of a processing unit. During operation, the processor 104a executes one or more programs which may be contained within the memory 104*b* and, as such, controls the general operation of the controller 104 and the computer system of the controller 104 in executing the functions described herein. In the depicted embodiment, the memory 104*b* stores the above-referenced program(s).

Generally, the controller 104, is used to provide at least some of the engine system operations and functions described herein and, in particular, controls operation of the electrified air system 80 and motor-generator unit 98. In general, the controller 104 is electrically coupled with: the engine 32; the EGR pump 76; the e-turbocharger 46; the motor-generator unit 98; an engine speed sensor 106; and sensor(s) 108 that may include any or all of mass airflow, temperature, and pressure sensors in the intake manifold 38, exhaust manifold 40, or charge air passageway 62, and/or fuel sensors. While sensors 106, 108 are shown in FIG. 2 as separate, dedicated sensors, it is recognized that sensing capabilities for measuring some parameters may be built-in to components of the engine system 30. The controller 104 may also be coupled with other devices necessary to provide the desired system control functions. The controller 104 receives inputs from the various sensors that generate signals in proportion to various physical parameters associated with various components in the engine system 30 and any other sources. In some embodiments, the controller 104 may be configured to provide other functionality of the work vehicle 20 in addition to the control functions disclosed herein.

In one implementation, the controller 104 receives inputs on the engine speed and engine load (as determined by air flow and fuel requested/required, for example) to control operation of the EGR pump 76 and e-turbocharger 46. That is, the controller is able to independently control operation of the EGR pump 76 and e-turbocharger 46, including a mode of operation of the respective electrical machines 82, 84 therein and the operating speed of the electrical machines 82, 84. Regarding the operating mode of the electrical machines 82, 84, such modes can include a motoring mode and a generating mode. Additionally, the electrical machines 82, 84 may be non-operative (i.e., idle or non-spinning) for desired periods (i.e., in neither motoring mode or generating mode) and the electrical machine 84 of the EGR pump 76 may operate in a reverse mode. By such control of the EGR pump 76 and e-turbocharger 46, the controller 104 is therefore able to control various operational aspects of the engine system 30 that affect the overall operating efficiency thereof, including a dP mismatch between the intake side pressure and exhaust side pressure of the engine 32, a boost provided to the engine 32 via increased flows of intake air and/or exhaust gas, and the amount of electrical power provided back to the electrical system 90 (to recharge the energy storage device 92, for example) during operation of the electrical machines 82, 84 in generating mode.

In general, the controller 104 may control operation of the EGR pump 76 and e-turbocharger 46 as part of an engine system optimization that achieves performance targets with an optimized fuel efficiency versus emissions trade-off. In doing so, the controller 104 may access an engine map stored in the memory 104*b* that includes data on a plurality of operating conditions of the engine system 30, including operation of the engine 32 at a plurality of speeds and a plurality of loads. The controller 104 may then selectively operate the e-turbocharger 46 and/or EGR pump 76 based on a current operating condition, as referenced against the plurality of operating conditions in the engine map, including operation of the electrical machines 82, 84 in the motoring mode and the generating mode. That is, the controller 104 will selectively operate the e-turbocharger 46 and/or EGR pump 76 during different combinations of low/high speed engine operation and low/high torque engine operation to boost intake air and EGR flow to the engine and/or generate electrical power that may be put back into the electrical system 90. Still further, the controller 104 may also monitor engine system operation to identify highly transient periods of operation during the e-turbocharger 46 may be operated to boost the engine 32.

As one example, during a low speed-high torque operation of the engine 32, the controller may cause the electrical machine 82 of the e-turbocharger 46 to operate in motoring mode. Operation of the electrical machine 82 in motoring mode provides additional rotational power to the shaft 56 and enables the compressor 52 to provide an increased flow of intake air to the engine 32 for low-speed torque. The controller 104 is programmed to temporarily operate the electrical machine 82 in motoring mode, so as to improve transient response in the engine system 30 and provide the desired engine boost. During this period, the electrical machine 84 of the EGR pump 76 may be either non-spinning or operate in motoring mode or generating mode. In one embodiment, the electrical machine 84 remains non-spinning during operation of the electrical machine 82 of the e-turbocharger 46 in motoring mode (during a low speed—high torque condition), since it is recognized that EGR (as would occur with electrical machine 84 operating in motoring mode) may not be desired during this time and generation of electrical power (as would occur with electrical machine 84 operating in generating mode) may be impractical.

As another example, during a high exhaust flow condition of the engine 32, the controller may cause the electrical machine 82 of the e-turbocharger 46 to operate in generating mode. Operation of the electrical machine 82 in generating mode allows for the rotating shaft 56 in the e-turbocharger 46 to drive rotation of the electrical machine 82 to generate electrical power via the electrical machine 82 (which is provided back into the electrical system 90), as there may be a large amount of exhaust gas driving the e-turbocharger 46 during a high engine load condition. During this period, the electrical machine 84 of the EGR pump 76 may operate in motoring mode, or generating mode, or a non-spinning mode of operation. It is recognized that operation of the electrical machine 82 of the e-turbocharger 46 in generating mode may create a larger negative dP that helps to drive EGR, such that work performed by the EGR pump 76 may be reduced (i.e., EGR can occur without the EGR pump 76 operating in motoring mode or with the EGR pump 76 operating in motoring mode but at a lower speed or power level). Accordingly, due at least in part to the electrical power generated by the electrical machine 82 of the e-turbocharger 46 (via operation in generating mode) and the reduced work performed by the EGR pump 76, more synergetic benefits to fuel efficiency may be achieved via this operational scheme of the e-turbocharger 46 and EGR pump 76.

In controlling operation of the e-turbocharger 46, the controller 104 may also further selectively cause the electrical machine 82 therein to selectively operate in generating mode based (in part) on the state-of-charge of the energy storage device 92. The controller 104 may monitor the state-of-charge of the energy storage device 92 and compare the state-of-charge to a state-of-charge threshold. When the state-of-charge of the energy storage device 92 is below that state-of-charge threshold, the controller 104 may allow/cause operation of the electrical machine 82 in generating mode (based as well on the engine speed/load and transient state). Conversely, when the state-of-charge of the energy storage device 92 is above state-of-charge threshold, the controller 104 may prevent operation of the electrical machine 82 in generating mode and instead cause the electrical machine 82 to be idle.

With regard to operation of the EGR pump 76, the controller 104 may generally cause the EGR pump 76 to operate in motoring mode when an intake side pressure of the engine 32 (i.e., at the intake manifold 38) plus EGR pump system losses is greater than an exhaust side pressure of the engine 32 (i.e., at the exhaust manifold 40)—a positive dP—and cause the EGR pump 76 to operate in generating mode when the intake side pressure of the engine 32 (minus EGR pump losses) is less than the exhaust side pressure of the engine 32—a negative dP. For operation of the EGR pump 76 in the generating mode, it is recognized that such operation would likely occur when there is a larger negative dP value present in the engine system 30.

Additionally, and as previously indicated, the controller 104 may also cause the EGR pump 76 to operate in a reverse mode whereby compressed intake air is supplied into the EGR passageway 72 and into the exhaust gas passageway 66 upstream of the HP turbine 48. The injection of fresh air into the exhaust gas passageway 66 upstream of the HP turbine 48 that is provided by operation of the EGR pump 76 in reverse mode boosts the air inflow/pressure to the HP and LP turbines 48, 50 and increases the rotational speed thereof, thereby improving transient response of the e-turbocharger 46 and driving the compressors 52, 54 at an increased speed to boost the supply of compressed charge air provided to the engine 32.

Figure 3:
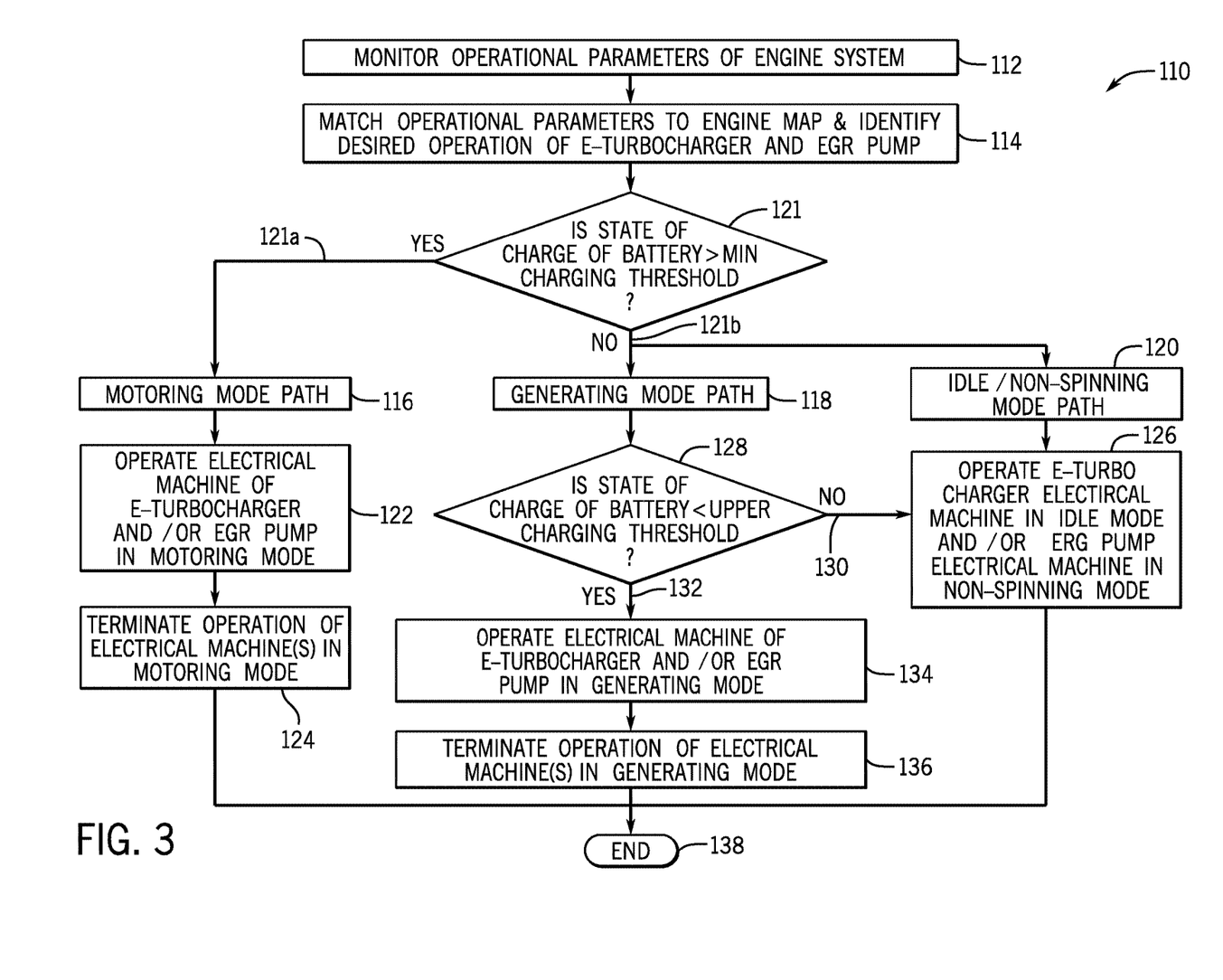
FIG. 3 is a flowchart of an example method of operating the engine system of FIG. 2 in accordance with an embodiment.

Referring now to FIG. 3, and with continued reference to FIGS. 1-2, a flowchart of a method 110 for operating the engine system 30 is provided in accordance with the present disclosure, such as may be performed by the controller 104. Generally, the method 110 is implemented during operation of the work vehicle 20. As will be explained in detail below, the method 110 implements a control strategy for selectively operating an e-turbocharger (e.g., e-turbocharger 46) and EGR pump 76 in engine system 30 in a manner that achieves operating efficiency of the engine system 30, such as by optimizing a fuel efficiency versus emissions trade-off.

The method 110 begins at step 112 with a monitoring of various operational parameters of the engine system 30 (including engine 32), which may include: engine speed; engine load; mass airflow, temperature, and pressure in intake/charge or exhaust gas; and fuel flow. In monitoring these parameters, the controller 104 may receive a series of inputs from the various sensors 106, 108 in the engine system. In addition to the parameters themselves, the controller 104 may also monitor a rate of change of certain parameters of the engine 32, including a rate of change of the engine speed or engine load, for example, that might be indicative of a transient condition in the engine system 30.

In connection with monitoring the various operational parameters of the engine system 30, the controller 104—at step 114—also matches the operational parameters to an engine map stored in the memory 104b that includes data on a plurality of operating conditions of the engine system 30, including operation of the engine 32 at a plurality of speeds and a plurality of loads. Based on a current operating condition, as derived from the monitored operational parameters and as referenced against the plurality of operating conditions in the engine map, the controller also identifies at step 114 a desired operation for the engine system 30 (e.g., desired operational mode), including a desired operation the e-turbocharger 46 and/or EGR pump 76. The desired operation of the e-turbocharger 46 and EGR pump 76 includes a desired operational mode of the electrical machines 82, 84 included therein, which as described above includes a motoring mode, a generating mode, and an idle or non-spinning mode, as well as a speed of the electrical machines 82, 84 (when in motoring mode). The desired operational modes are generally indicated at steps 116, 118, 120 in FIG. 3 and identified as a motoring mode path 116, a generating mode path 118, and an idle/non-spinning mode path 120. It is noted that the method 110 may proceed down multiple paths simultaneously, with the electrical machine 82 of the e-turbocharger 46 proceeding down one path and the electrical machine 84 of the EGR pump 76 proceeding down another path. As previously indicated, the electrical machine 82 and electrical machine 84 are operated independent from one another (via controller 104), and thus operation thereof in different modes and at different times is possible to achieve an optimized/targeted operating efficiency of the engine system 30.

Prior to the method 110 proceeding down one of the mode paths 116, 118, 120, a determination is made by the controller 104 at step 121 regarding whether the electrical system 90 in the engine system 30 is enabled, with this including a determination of the present state-of-charge of the energy storage device 92 and comparison of that state-of-charge to a pre-determined minimum state-of-charge threshold, with it recognized that the energy storage device 92 should exceed such a minimum state-of-charge threshold in order to be capable of operating the electrical machine(s) 82, 84 in the motoring mode (i.e., providing power to the electrical machine(s) 82, 84). Regarding the determination at step 121, it is recognized that this determination is directed primarily to determining an operating mode for the electrical machine 82 and that operation of the electrical machine 84 (and associated operation of the EGR pump 76) is dictated primarily by meeting engine-out emissions targets, regardless of the state-of-charge of the energy storage device 92. However, the below discussion includes a description of the operation of the electrical machine 84 in the various modes 116, 118, 120 as it fits within the framework of meeting engine out emissions targets.

If it is determined at step 121 that the state-of-charge of the energy storage device 92 is above the minimum state-of-charge threshold, as indicated at 121a, then it is determined that the energy storage device 92 is charged sufficiently to provide power to the electrical machine(s) 82, 84 in a motoring mode of operation, such that the method 110 proceeds down the motoring path 116. Conversely, if it is determined at step 121 that the state-of-charge of the energy storage device 92 is below the minimum state-of-charge threshold, as indicated at 121b, then it is determined that the energy storage device 92 is not charged sufficiently to provide power to the electrical machine(s) 82, 84 in a motoring mode of operation, such that the method 110 then instead proceeds down one of the generating mode path 118 and the idle/non-spinning mode path 120. Operation in the different mode paths 116, 118, 120 will now be explained in greater detail below.

In proceeding down the motoring mode path 116, the method 110 continues at step 122 with the controller 104 causing the electrical machine(s) 82, 84 of the e-turbocharger 46 and/or EGR pump 76 to operate in motoring mode. As previously described, operation of the electrical machine 82 of the e-turbocharger 46 in motoring mode provides additional rotational power to the shaft 56 and enables the compressor 52 to provide an increased flow of intake air to the engine 32 for low-speed torque, while operation of the electrical machine 84 of the EGR pump 76 in motoring mode drives components (e.g., rotors 86) of the EGR pump to recirculate exhaust gas from the exhaust gas passageway 866 to the engine 32 via the EGR passageway 72. Additionally, regarding operation of the electrical machine 84 of the EGR pump 76, it is recognized that operation of the electrical machine as a motor can include operation thereof in the reverse mode, whereby the EGR pump 76 operates to supply compressed intake air into the EGR passageway 72 and into the exhaust gas passageway 66 upstream of the HP turbine 48 and thereby boost the air inflow/pressure to the HP and LP turbines 48, 50 and increases the rotational speed thereof, thereby improving transient response of the e-turbocharger 46 and driving the compressors 52, 54 at an increased speed to boost the supply of compressed charge air provided to the engine 32.

Operation of the electrical machine(s) 82, 84 in motoring mode is terminated at step 124, with such termination being controlled by controller 104 according to one of a number of possible control schemes. In one embodiment, termination of the electrical machine(s) 82, 84 may occur at step 124 upon a certain operational parameter in the engine system 30 reaching a desired level, such as an air-fuel ratio in the engine 32 for example. In another embodiment, termination of the electrical machine(s) 82, 84 may occur at step 124 after a pre-determined period of time has passed.

In proceeding down the idle/non-spinning mode path 120, the method 110 continues at step 126 with the controller 104 causing the electrical machine 82 of the e-turbocharger 46 to remain idle. With the electrical machine 82 operating in idle, no additional boost is provided to the e-turbocharger 46 for flowing intake air to the engine 32, although intake air may still flow back to the engine 32 due to a sufficient flow of exhaust gas driving the turbine 48 of the e-turbocharger 46 (and in turn driving the compressor 52) and/or a sufficient negative dP being present to recirculate exhaust gas (without operation of the EGR pump 76 in motoring mode). In proceeding down the idle/non-spinning mode path 120, the controller 104 may also cause the electrical machine 84 to operate in a non-spinning or zero-speed condition, but (as previously described) it is recognized that operation of the electrical machine 84 (and associated operation of the EGR pump 76) is dictated primarily by meeting engine-out emissions targets, regardless of the state-of-charge of the energy storage device 92.

In proceeding down the generating mode path 118, the method 110 may continue at step 128 with the controller 104 first making a determination whether the electrical system 90 in the engine system 30 is enabled, with this including a determination of the present state-of-charge of the energy storage device 92 and comparison of that state-of-charge to a pre-determined upper state-of-charge threshold. If it is determined at step 128 that the state-of-charge of the energy storage device 92 is above the upper state-of-charge threshold, as indicated at 130, then it is determined that additional charging of the energy storage device 92—as may be achieved by operating the electrical machine 82 of the e-turbocharger 46 in generating mode to provide electrical power back to the electrical system 90—is not desired or feasible. The method thus continues to step 126 where, as previously described, the electrical machine 82 of the e-turbocharger 46 is kept idle, such that no electrical power is generated thereby. Conversely, if the state-of-charge of the energy storage device 92 is below the upper state-of-charge threshold, as indicated at 132, the method then continues to step 134 where the controller 104 allows/causes operation of the electrical machine 82 of the e-turbocharger 46 in generating mode. As previously described, operation of the electrical machine 82 of the e-turbocharger 46 in generating mode allows for the rotating shaft 56 in the e-turbocharger 46 to drive rotation of the electrical machine 82 in order to generate electrical power via the electrical machine 82, which is provided back into the electrical system 90 to recharge the energy storage device 92 and/or run other electrical components of the engine system 30 (e.g., a cooling pump or fan motor cooling).

In proceeding down the generating mode path 118, the controller 104 may also allow/cause operation of the electrical machine 84 in a generating mode. However, as previously described, it is recognized that operation of the electrical machine 84 (and associated operation of the EGR pump 76) is dictated primarily by meeting engine-out emissions targets regardless of the state-of-charge of the energy storage device 92. Operation of the electrical machine 84 of the EGR pump 76 in generating mode allows for the components (e.g., rotors 86) of the EGR pump 76 to turn and drive rotation of the electrical machine 84 in order to generate electrical power via the electrical machine 84, which is provided back into the electrical system 90 as previously described.

Operation of the electrical machine 82 in generating mode is terminated at step 136, with such termination being controlled by controller 104 responsive to a number of possible parameters, such as the pre-determined state-of-charge threshold being reached or controller 104 determining that changing the operational mode of the electrical machine 82 is desired, for example.

As shown in FIG. 3, the method 110 may end at step 138 after proceeding down any of the paths 116, 118, 120, with it recognized that the method 110 would then loop back and continue to be performed by the controller 104 during ongoing operation of the work vehicle 20.

Beneficially, the engine system 30 as described herein—as well as control/operation of the engine system 30 according to the described method 110—provides for controlled operation of an electrified air system 80 (including an e-turbocharger 46 and EGR pump 76 therein and their associated electrical machines 82, 84) to control various operational aspects of the engine system 30 that affect the overall operating efficiency thereof. For example, selective operation of the electrical machines 82, 84 of the e-turbocharger 46 and EGR pump 76 in a desired mode (motoring, generating, or idle), allows for control of a dP mismatch between the intake side pressure and exhaust side pressure of the engine 32, including minimizing a difference between the air intake side pressure and the exhaust side pressure to a small positive dP value or small negative dP value or, ideally, to a zero dP value. Selective operation of the electrical machines 82, 84 of the e-turbocharger 46 and EGR pump 76 in a desired mode may also provide a boost to the engine 32 via increased flows of intake air and/or exhaust gas or generate electrical power that is provided back to the electrical system 90 to recharge the energy storage device 92, for example.

ENUMERATED EXAMPLES

The following examples are provided, which are numbered for ease of reference.

1. An engine system includes an internal combustion engine having an engine block with one or more piston-cylinder arrangements communicating with an intake manifold and an exhaust manifold, and an electrical power system configured to provide electrical power in the engine system, the electrical power system comprising an energy storage device and an electrical bus. The engine system also includes an electrified air system powered by the electrical power from the electrical power system to selectively increase a flow of intake air and exhaust gas to the engine. The electrified air system further includes an exhaust gas recirculation (EGR) pump operable to recirculate a portion of exhaust gas output from the exhaust manifold back to the intake manifold and an electric turbocharger having a turbine in communication with the exhaust manifold, a compressor in communication with the intake manifold and driven by the turbine via a shaft coupled therebetween, and an electrical machine coupled to the shaft. The electrical machine is configured to operate in a motoring mode to drive the shaft and cause the compressor to output boosted intake air to the engine and operate in a generating mode to transform rotational power from the shaft into electrical power that is provided back into the electrical power system.

2. The engine system of example 1, wherein the EGR pump is configured to operate in an EGR motoring mode to recirculate the portion of exhaust gas and operate in an EGR generating mode to provide electrical power back into the electrical power system, responsive to a flow of exhaust gas flowing through the EGR pump.

3. The engine system of example 2, wherein the EGR pump operates in the EGR motoring mode when intake side pressure forces of the engine plus any EGR system energy losses exceed exhaust side pressure forces of the engine and operates in the EGR generating mode when the intake side pressure forces of the engine plus the EGR system energy losses is less than the exhaust side pressure forces of the engine.

4. The engine system of example 1, wherein the EGR pump is included in an EGR system in the electrified air system, with the EGR system further including an EGR passageway extending between an outlet of the exhaust manifold and an inlet of the intake manifold and an EGR cooler operable to cool the portion of the exhaust gas flowing through the EGR passageway for providing to the intake manifold, wherein the EGR pump is positioned in-line with the EGR passageway.

5. The engine system of claim 4, wherein the EGR pump is configured to operate in a reverse mode to supply compressed intake air into the EGR gas passageway upstream of the turbine, such that the turbine receives both exhaust gas and compressed intake air.

6. The engine system of example 4, wherein the electrified air system comprises a low-pressure turbocharger and a high-pressure turbocharger, and wherein the electric turbocharger is one of the low-pressure turbocharger and the high-pressure turbocharger.

7. The engine system of example 6, wherein the EGR passageway draws the portion of the exhaust gas from a location upstream from the high-pressure turbocharger or from a location downstream of one or both of the high-pressure and low-pressure turbochargers.

8. The engine system of example 1, further comprising a motor-generator unit configured to receive the electrical power from the energy storage device and provide rotational power to a crankshaft of the engine to boost a torque output of the engine.

9. The engine system of example 1, wherein the energy storage device comprises a battery, and wherein the electrical power provided back into the electrical power system by the electrical machine operating in generating mode recharges the battery.

10. The engine system of example 1, further comprising a controller, including a processor and memory architecture, operably connected with the electrified air system, the controller configured to access an engine map stored in the memory architecture comprising a plurality of operating conditions of the engine including a plurality of speeds and a plurality of loads and selectively operate the electrical machine in the motoring mode or the generating mode based on a current operating condition, as referenced against the plurality of operating conditions in the engine map.

11. The engine system of example 10, wherein the controller is configured to operate the electrical machine and the EGR pump to minimize a difference between an air intake side pressure of the engine and an exhaust side pressure of the engine.

12. The engine system of example 10, wherein the controller is configured to monitor a state-of-charge of the energy storage device, compare the state-of-charge of the energy storage device to a state-of-charge threshold, and when the state-of-charge of the energy storage device is below the state-of-charge threshold, operate the electrical machine in the generating mode.

13. An engine system for a non-road vehicle includes an internal combustion engine having an engine block with one or more piston-cylinder arrangements communicating with an intake manifold and an exhaust manifold, and an electrical power system configured to provide electrical power in the engine system, the electrical power system comprising an energy storage device and an electrical bus. The engine system also includes an electrified air system powered by the electrical power from the electrical power system to selectively increase a flow of intake air and exhaust gas to the engine, with the electrified air system further including an exhaust gas recirculation (EGR) pump operable to recirculate a portion of exhaust gas output from the exhaust manifold back to the intake manifold and an electric turbocharger having a turbine in communication with the exhaust manifold, a compressor in communication with the intake manifold and driven by the turbine via a shaft coupled therebetween, and an electrical machine coupled to the shaft to provide rotational power thereto or receive rotational power therefrom. The engine system further includes a controller, including a processor and memory architecture, operably connected with the electrified air system to control operation thereof, the controller configured to monitor engine speed and engine load during operation of the engine and selectively operate the electrical machine in a motoring mode and a generating mode based on the engine speed and the engine load, wherein the electrical machine provides rotational power to the shaft to output boosted intake air to the engine when operating in the motoring mode and transforms rotational power from the shaft into electrical power that is provided back into the electrical power system when operating in the generating mode.

14. The engine system of example 13, wherein the electrical power provided back into the electrical power system from the electrical machine is provided to the electrical bus and subsequently to one or more of the energy storage device, the electric turbocharger, the EGR pump, or a motor-generator unit that provides rotational power to a crankshaft of the engine.

15. The engine system of example 13, wherein the controller is configured to selectively operate the EGR pump in an EGR motoring mode and an EGR generating mode based on the engine speed and engine load, and wherein the EGR pump recirculates the portion of exhaust gas when operating in the EGR motoring mode and provides electrical power back into the electrical power system, responsive to a flow of exhaust gas flowing through the EGR pump, when operating in the EGR generating mode.

CONCLUSION

The foregoing has thus provided an engine system that having an electrified air system that may be operated to control various operational aspects of the engine system that affect the overall operating efficiency thereof. The electrified air system includes an e-turbocharger and EGR pump each having an electrical machine operable in different operational modes, including a motoring mode and generating mode, thereby enabling more efficient turbo-matching in the electrified air system and the achieving of desired performance and fuel efficiency targets. Selective operation of the e-turbocharger and EGR pump in the motoring and generating modes allows for control of a dP mismatch between the intake side pressure and exhaust side pressure of the engine system, provides a boost to the engine via increased flows of intake air and/or exhaust gas, and generates electrical power that is provided back to the electrical system to recharge energy storage devices or run other electrical components.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An engine system comprising:
   an engine having one or more piston-cylinder arrangements communicating with an intake manifold and an exhaust manifold;
   an electrical power system configured to provide electrical power in the engine system, the electrical power system comprising an energy storage device and an electrical bus; and
   an electrified air system powered by the electrical power from the electrical power system to selectively increase a flow of intake air and exhaust gas to the engine, the electrified air system comprising:
      an exhaust gas recirculation (EGR) pump; and
      an electric turbocharger having:
         a turbine in communication with the exhaust manifold;
         a compressor in communication with the intake manifold and driven by the turbine via a shaft coupled therebetween; and
         an electrical machine coupled to the shaft; and
   a controller, including a processor and memory architecture, operably connected with the electrified air system, the controller configured to:
      operate the EGR pump in a forward mode to recirculate a portion of exhaust gas output from the exhaust manifold back to the intake manifold; and
      operate the EGR pump in a reverse mode to supply compressed intake air from the intake manifold to the turbine of the electric turbocharger so that the turbine receives both exhaust gas and compressed intake air;
      wherein the controller selectively controls the EGR pump to operate in reverse mode when the controller receives an input of engine speed or engine load calling for a boost of compressed charge air to the engine to increase engine power.

2. The engine system of claim 1, wherein the EGR pump is included in an EGR system in the electrified air system, the EGR system further including:
   an EGR passageway extending between an outlet of the exhaust manifold and an inlet of the intake manifold; and
   an EGR cooler operable to cool the portion of the exhaust gas flowing through the EGR passageway for providing to the intake manifold;
   wherein the EGR pump is positioned in-line with the EGR passageway.

3. The engine system of claim 2, wherein the electrified air system comprises a low-pressure turbocharger and a high-pressure turbocharger, and wherein the electric turbocharger is one of the low-pressure turbocharger and the high-pressure turbocharger.

4. The engine system of claim 3, wherein the EGR passageway draws the portion of the exhaust gas from a location upstream from a turbine of the high-pressure turbocharger.

5. The engine system of claim 3, wherein the EGR passageway draws the portion of the exhaust gas from a location downstream of one or both of the high-pressure and low-pressure turbochargers.

6. The engine system of claim 1, further comprising a motor-generator unit configured to receive the electrical power from the energy storage device and provide rotational power to a crankshaft of the engine to boost a torque output of the engine.

7. The engine system of claim 1, wherein the energy storage device comprises a battery, and wherein the electrical power provided back into the electrical power system by the electrical machine operating in generating mode recharges the battery.

8. The engine system of claim 1, wherein the controller configured to:
   access an engine map stored in the memory architecture comprising a plurality of operating conditions of the engine including a plurality of speeds and a plurality of loads; and
   selectively operate the electrical machine in the motoring mode or the generating mode based on a current operating condition, as referenced against the plurality of operating conditions in the engine map.

9. The engine system of claim 8, wherein the controller is configured to operate the electrical machine and the EGR pump to minimize a difference between an air intake side pressure of the engine and an exhaust side pressure of the engine.

10. The engine system of claim 8, wherein the controller is configured to:
monitor a state-of-charge of the energy storage device;
compare the state-of-charge of the energy storage device to a state-of-charge threshold; and
when the state-of-charge of the energy storage device is below the state-of-charge threshold, operate the electrical machine in the generating mode.

11. The engine system of claim 1, wherein the controller is configured to:
operate the electrical machine of the electric turbocharger in a motoring mode to drive the shaft and cause the compressor to output boosted intake air to the engine; and
operate the electrical machine of the electric turbocharger in a generating mode to transform rotational power from the shaft into electrical power that is provided back into the electrical power system.

12. The engine system of claim 1, wherein the controller is configured to:
operate the EGR pump in an EGR motoring mode to recirculate the portion of exhaust gas when intake side pressure forces of the engine plus any EGR system energy losses exceed exhaust side pressure forces of the engine; and
operate the EGR pump in an EGR generating mode to provide electrical power back into the electrical power system, responsive to a flow of exhaust gas flowing through the EGR pump when the intake side pressure forces of the engine plus the EGR system energy losses is less than the exhaust side pressure forces of the engine.

13. An engine system for a non-road vehicle, the engine system comprising:
an engine having one or more piston-cylinder arrangements communicating with an intake manifold and an exhaust manifold;
an electrical power system configured to provide electrical power in the engine system, the electrical power system comprising an energy storage device and an electrical bus; and
an electrified air system powered by the electrical power from the electrical power system to selectively increase a flow of intake air and exhaust gas to the engine, the electrified air system comprising:
an exhaust gas recirculation (EGR) pump operable to recirculate a portion of exhaust gas output from the exhaust manifold back to the intake manifold; and
an electric turbocharger comprising:
a turbine in communication with the exhaust manifold;
a compressor in communication with the intake manifold and driven by the turbine via a shaft coupled therebetween; and
an electrical machine coupled to the shaft to provide rotational power thereto or receive rotational power therefrom; and
a controller, including a processor and memory architecture, operably connected with the electrified air system to control operation thereof, the controller configured to:
monitor engine speed and engine load during operation of the engine;
selectively operate the electrical machine in a motoring mode and a generating mode based on the engine speed and the engine load wherein the electrical machine provides rotational power to the shaft to output boosted intake air to the engine when operating in the motoring mode and transforms rotational power from the shaft into electrical power that is provided back into the electrical power system when operating in the generating mode; and
selectively operate the EGR pump in an EGR motoring mode and an EGR generating mode based on the engine speed and engine load, wherein the EGR pump recirculates the portion of exhaust gas when operating in the EGR motoring mode and provides electrical power back into the electrical power system, responsive to a flow of exhaust gas flowing through the EGR pump, when operating in the EGR generating mode; and
selectively operate the EGR pump in a reverse mode to supply compressed intake air from the intake manifold into an EGR gas passageway upstream of the turbine based on the engine speed and engine load, such that the turbine receives both exhaust gas and compressed intake air by which the turbine drives the compressor to boost compressed charge air to the engine to increase engine power.

14. The engine system of claim 13, further comprising a motor-generator unit that receives the electrical power from the energy storage device and provides rotational power to a crankshaft of the engine to boost a torque output of the engine.

15. The engine system of claim 14, wherein the electrical power provided back into the electrical power system from the electrical machine is provided to the electrical bus and subsequently to one or more of the energy storage device, the electric turbocharger, the EGR pump, or the motor-generator unit.

16. The engine system of claim 13, wherein the EGR pump is included in an EGR system in the electrified air system, the EGR system further including:
an EGR passageway extending between an outlet of the exhaust manifold and an inlet of the intake manifold; and
an EGR cooler operable to cool the portion of the exhaust gas flowing through the EGR passageway for providing to the intake manifold;
wherein the EGR pump is positioned in-line with the EGR passageway.

17. The engine system of claim 16, wherein the electrified air system comprises a low-pressure turbocharger and a high-pressure turbocharger, and wherein the electric turbocharger is one of the low-pressure turbocharger and the high-pressure turbocharger.

* * * * *